United States Patent
Lin

(10) Patent No.: US 10,158,309 B1
(45) Date of Patent: Dec. 18, 2018

(54) MOTOR CONTROL DEVICE, MOTOR CONTROL SYSTEM USING THE SAME AND CONTROL MODULE OF THE SAME

(71) Applicant: Kuo-Tsun Lin, Taichung (TW)

(72) Inventor: Kuo-Tsun Lin, Taichung (TW)

( * ) Notice: Subject to any disclaimer, the term of this patent is extended or adjusted under 35 U.S.C. 154(b) by 0 days.

(21) Appl. No.: 15/793,330

(22) Filed: Oct. 25, 2017

(51) Int. Cl.
*F04D 15/00* (2006.01)
*H02P 7/06* (2006.01)
*H02K 11/33* (2016.01)
*F04D 25/08* (2006.01)
*H02K 11/00* (2016.01)
*F04D 27/00* (2006.01)

(52) U.S. Cl.
CPC .............. *H02P 7/06* (2013.01); *F04D 25/088* (2013.01); *H02K 11/0094* (2013.01); *H02K 11/33* (2016.01); *F04D 27/004* (2013.01)

(58) Field of Classification Search
CPC ................................................. H05B 33/0815
See application file for complete search history.

(56) References Cited

U.S. PATENT DOCUMENTS

2012/0080944 A1* 4/2012 Recker ..................... H02J 9/02
307/25

* cited by examiner

*Primary Examiner* — Karen Masih
(74) *Attorney, Agent, or Firm* — Lewis Roca Rothgerber Christie LLP

(57) ABSTRACT

A motor control device includes: a receiver module used to receive a remote control signal, and generating a remote control input signal in response to receipt of the remote control signal; and a control module used to receive an input voltage, used to be coupled to a pull switch device for receiving a pull switch input signal therefrom, coupled further to the receiver module for receiving the remote control input signal therefrom, and used to be coupled further to a variable frequency DC motor of a ceiling fan. Based on the input voltage, the pull switch input signal and the remote control input signal, the control module operates the motor by turning on/off the motor, or by adjusting a rotary speed of the motor when the same is turned on.

17 Claims, 2 Drawing Sheets

MOTOR CONTROL DEVICE, MOTOR CONTROL SYSTEM USING THE SAME AND CONTROL MODULE OF THE SAME

FIELD

The disclosure relates to motor control, and more particularly to a motor control device for controlling a variable frequency direct current (DC) motor of a ceiling fan, to a motor control system using the same, and to a control module of the same.

BACKGROUND

For a conventional cord controlled ceiling fan, a cord of the ceiling fan may be pulled by a user to change a gear ratio of a gearbox of the ceiling fan, thereby adjusting a rotary speed of a motor of the ceiling fan. The user has to be standing to reach and pull the cord each time he/she wants to adjust the rotary speed of the motor. This is inconvenient for the user, especially if the user is disabled or if the user (e.g., a child) is short.

In recent years, the conventional cord controlled ceiling fan may be modified to be wirelessly controlled by a remote controller. In the modified ceiling fan, a local controller is added, and is controlled by the remote controller to change a ratio by which a voltage is stepped down, thereby adjusting the rotary speed of the motor. Moreover, the gear ratio of the gearbox is fixed at its maximum, so that the voltage can be changed within a sufficiently large range; and as a consequence, the rotary speed of the motor cannot be adjusted by pulling the cord. In case the remote controller is lost, the user is unable to adjust the rotary speed of the motor.

SUMMARY

Therefore, an object of the disclosure is to provide a motor control device that can alleviate the drawbacks of the prior art, a motor control system using the same and a control module of the same.

According to an aspect of the disclosure, the motor control device is used to be coupled to a pull switch device and to a variable frequency direct current (DC) motor of a ceiling fan. The pull switch device generates a pull switch input signal in response to an operation performed thereon. The motor control device includes a receiver module and a control module. The receiver module is used to receive a remote control signal, and generates a remote control input signal in response to receipt of the remote control signal. The control module is used to receive an input voltage, is coupled to the pull switch device for receiving the pull switch input signal therefrom, is coupled further to the receiver module for receiving the remote control input signal therefrom, and is used to be coupled further to the variable frequency DC motor. Based on the input voltage, the pull switch input signal and the remote control input signal, the control module operates the variable frequency DC motor by turning on/off the variable frequency DC motor, or by adjusting a rotary speed of the variable frequency DC motor when the same is turned on.

According to another aspect of the disclosure, the motor control system is used to be coupled to a variable frequency DC motor of a ceiling fan. The motor control system includes a pull switch device and a motor control device. The pull switch device generates a pull switch input signal in response to an operation performed thereon. The motor control device includes a receiver module and a control module. The receiver module is used to receive a remote control signal, and generates a remote control input signal in response to receipt of the remote control signal. The control module is used to receive an input voltage, is coupled to the pull switch device and the receiver module for receiving the pull switch input signal and the remote control input signal respectively therefrom, and is used to be coupled further to the variable frequency DC motor. Based on the input voltage, the pull switch input signal and the remote control input signal, the control module operates the variable frequency DC motor by turning on/off the variable frequency DC motor, or by adjusting a rotary speed of the variable frequency DC motor when the same is turned on.

According to yet another aspect of the disclosure, the control module is used to be coupled to a pull switch device, to a receiver module and to a variable frequency DC motor of a ceiling fan. The pull switch device generates a pull switch input signal in response to an operation performed thereon. The receiver module generates a remote control input signal in response to receipt of a remote control signal. The control module includes a control unit and a driver unit. The control unit is used to receive an input voltage, and is used to be coupled to the pull switch device and the receiver module for receiving the pull switch input signal and the remote control input signal respectively therefrom. The driver unit is coupled to the control unit, and is used to be coupled to the variable frequency DC motor. The driver unit is controlled by the control unit based on the input voltage, the pull switch input signal and the remote control input signal to operate the variable frequency DC motor by turning on/off the variable frequency DC motor, or by adjusting a rotary speed of the variable frequency DC motor when the same is turned on.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
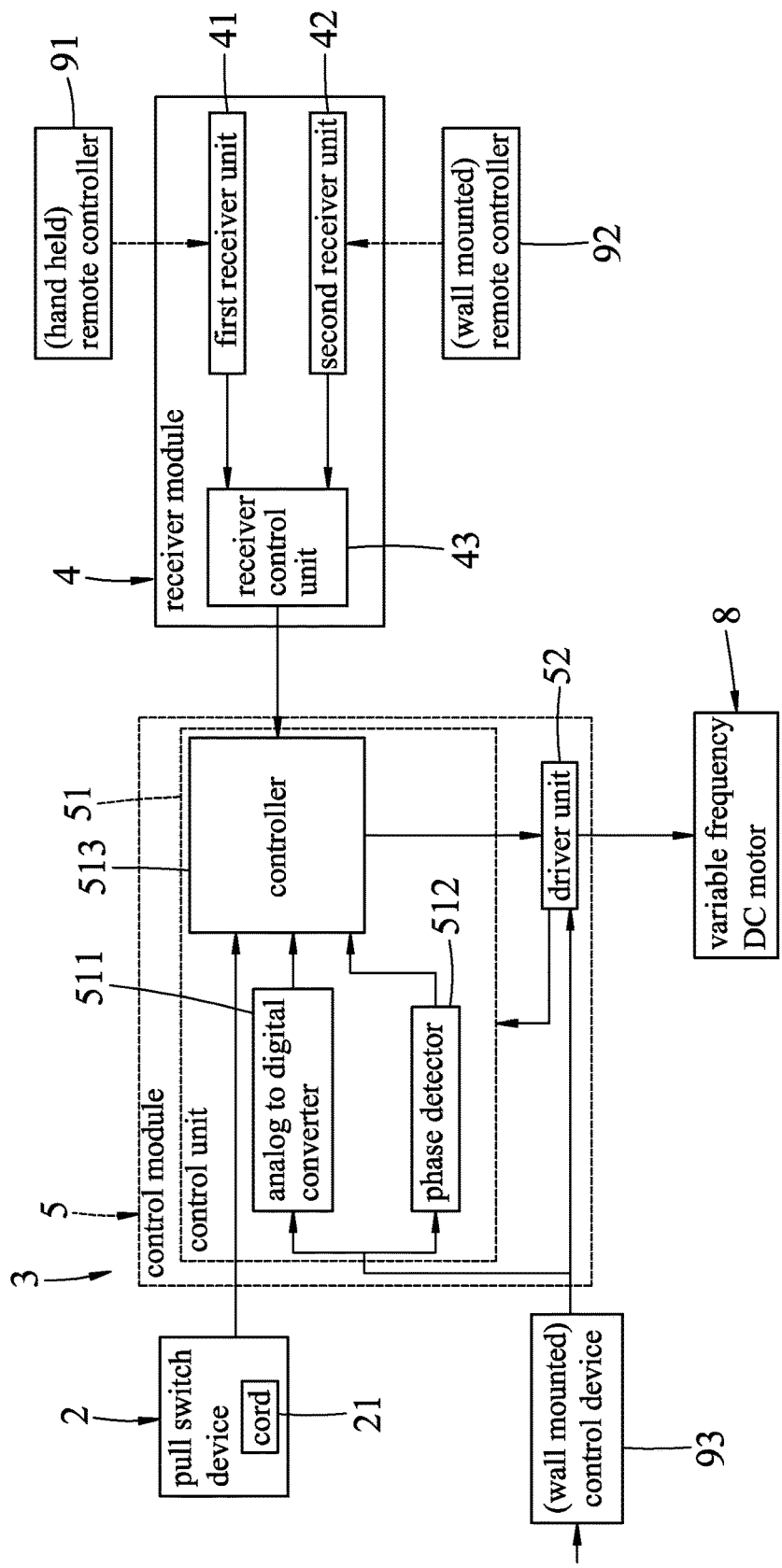
FIG. 1 is a block diagram illustrating an embodiment of a motor control system according to the disclosure.

Referring to FIG. 1, an embodiment of a motor control system according to the disclosure is used to be coupled to a variable frequency direct current (DC) motor 8 of a ceiling fan (not shown), and includes a control device 93, a pull switch device 2 and a motor control device 3.

The control device 93 (e.g., a wall mounted control device) is coupled to a mains power supply (not shown) for receiving an alternating current (AC) source voltage therefrom, and is operable to perform or not perform phase fired control on the source voltage to generate an input voltage. When the phase fired control is not performed, the source voltage is constantly outputted to serve as the input voltage (i.e., the input voltage is constantly equal to the source voltage). When the phase fired control is performed, the source voltage is alternately outputted and not outputted to generate the input voltage (i.e., the input voltage is equal to the source voltage when the source voltage is outputted, and is zero when the source voltage is not outputted), and the output of the source voltage starts at specific phases of the alternating cycle of the AC source voltage that are determined by the control device 93 based on an operation performed thereon. In an example, the control device 93 includes a triac or a switch, and the source voltage is outputted through the triac or the switch to serve as the input voltage when the triac or the switch conducts.

The pull switch device 2 includes a cord 21, and generates a pull switch input signal in response to an operation performed thereon (i.e., a pull on the cord 21).

The motor control device 3 includes a receiver module 4 and a control module 5.

The receiver module 4 includes a first receiver unit 41, a second receiver unit 42 and a receiver control unit 43. The first receiver unit 41 is used to wirelessly receive a first remote control signal from a remote controller 91 (e.g., a hand held remote controller), and generates a first input signal in response to receipt of the first remote control signal. The second receiver unit 42 is used to wirelessly receive a second remote control signal from another remote controller 92 (e.g., a wall mounted remote controller), and generates a second input signal in response to receipt of the second remote control signal. The receiver control unit 43 is coupled to the first and second receiver units 41, 42 for receiving the first and second input signals respectively therefrom, and generates a remote control input signal in response to receipt of any one of the first and second input signals. It should be noted that the receiver module 4 includes two receiver units 41, 42 in this embodiment, and may include fewer or more receiver units in a modification of this embodiment.

In this embodiment, each of the first and second receiver units 41, 42 uses a radio remote control standard (e.g., Bluetooth AVRCP, Zigbee RF4CE, etc.) or an infrared remote control standard (e.g., RC-5, SIRC, etc.); and the first and second receiver units 41, 42 use different remote control standards. In other words, two remote control standards are used in the motor control system of this embodiment. For example, the first receiver unit 41 and the corresponding remote controller 91 both use the same infrared remote control standard, and the second receiver unit 42 and the corresponding remote controller 92 both use the same radio remote control standard. It should be noted that, in a modification of this embodiment where the receiver module 4 includes more than two receiver units, the receiver units may use different remote control standards, thereby increasing diversity of the remote control standards that are used by the remote control system.

Figure 2:
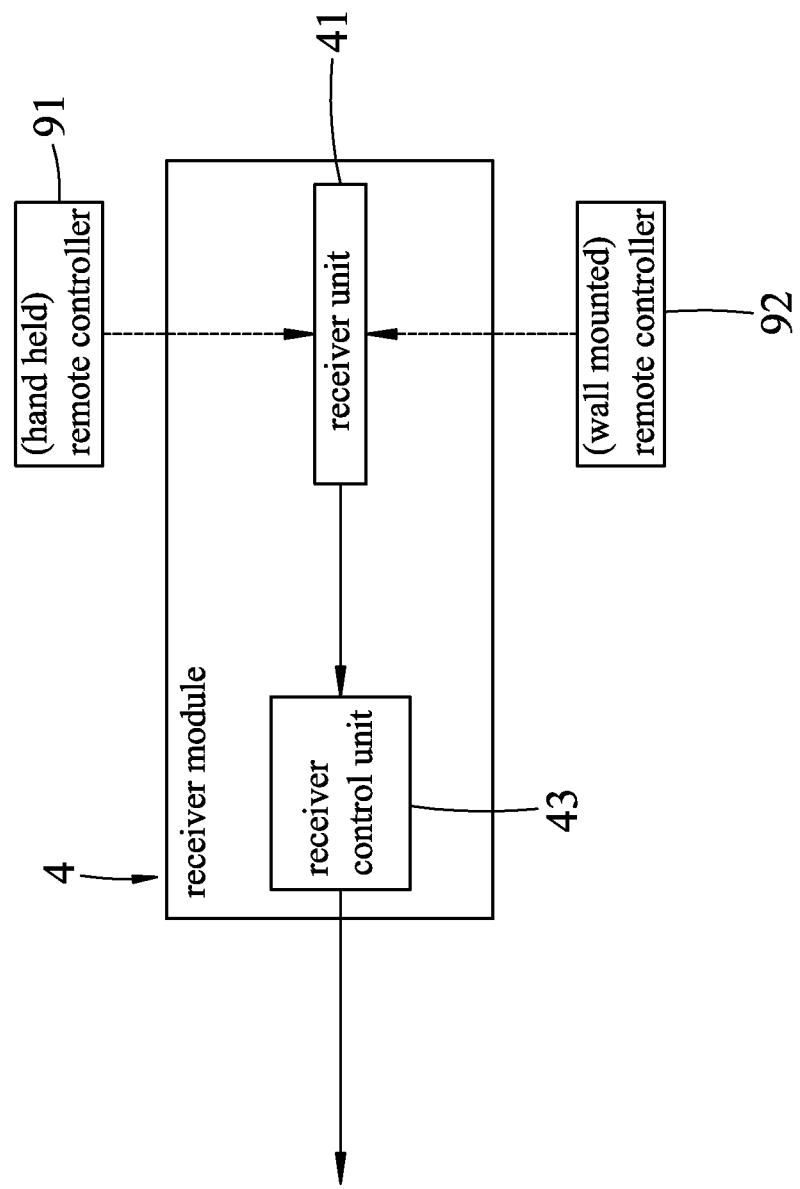
FIG. 2 is a block diagram illustrating a modification of a receiver module of the embodiment.

Referring to FIG. 2, in another modification of this embodiment where the receiver module 4 only includes a single receiver unit 41, the motor control system may be used with at least one remote controller that uses the same remote control standard as the receiver unit 41. In one example, the motor control system is used with a remote controller 91 (e.g., a hand held remote controller) and a remote controller 92 (e.g., a wall mounted remote controller) that use the same remote control standard (e.g., a radio remote control standard) as the receiver unit 41. In this case, the receiver unit 41 is used to wirelessly receive remote control signals from the remote controllers 91, 92, and generates an input signal in response to receipt of any one of the remote control signals.

Referring back to FIG. 1, the control module 5 is coupled to the control device 93, the pull switch device 2 and the receiver control unit 43 for receiving the input voltage, the pull switch input signal and the remote control input signal respectively therefrom, and is used to be coupled further to the variable frequency DC motor 8. Based on the input voltage, the pull switch input signal and the remote control input signal, the control module 5 operates the variable frequency DC motor 8 by turning on/off the variable frequency DC motor 8, or by adjusting a rotary speed of the variable frequency DC motor 8 when the same is turned on. It should be noted that, in a modification of this embodiment, the control device 93 may be omitted, and the control module 5 may be used to be coupled to the mains power supply for receiving the source voltage, which serves as the input voltage, therefrom.

In this embodiment, the control module 5 includes a control unit 51 and a driver unit 52. The driver unit 52 is coupled to the control device 93 for receiving the input voltage therefrom, is coupled further to the control unit 51, and is used to be coupled further to the variable frequency DC motor 8. The driver unit 52 rectifies and filters the input voltage to generate a first supply voltage for supplying power required thereby to operate the variable frequency DC motor 8, and performs DC to DC conversion on the first supply voltage to generate at least one second supply voltage for supplying another power required thereby and for supplying power required by the control unit 51. The driver unit 52 is controlled by the control unit 51 to operate the variable frequency DC motor 8.

In this embodiment, the control unit 51 includes an analog to digital converter 511, a phase detector 512 and a controller 513.

The analog to digital converter 511 is coupled to the control device 93 for receiving the input voltage therefrom, and performs analog to digital conversion on the input voltage to generate a conversion signal.

The phase detector 512 is coupled to the control device 93 for receiving the input voltage therefrom, and detecting a phase of the input voltage at which a magnitude of the input voltage becomes non-zero to generate a phase detection signal.

The controller 513 is coupled to the analog to digital converter 511, the phase detector 512, the pull switch device 2 and the receiver control unit 43 for receiving the conversion signal, the phase detection signal, the pull switch input signal and the remote control input signal respectively therefrom, and is coupled further to the driver unit 52. The controller 513 obtains an amplitude of the source voltage based on the conversion signal and the phase detection signal, and determines whether the input voltage is obtained from processing the source voltage (as opposed to the source voltage being directly taken to serve as the input voltage) based on the phase detection signal. When the phase indicated by the phase detection signal is non-zero (i.e., the control device 93 is present and performs phase fired control), it is determined that the input voltage is obtained from processing the source voltage. When the phase indicated by the phase detection signal is zero (i.e., the control device 93 is present and does not perform phase fired control, or the control device 93 is absent), it is determined that the input voltage is not obtained from processing the source voltage. Under a first circumstance where it is determined that the input voltage is obtained from processing the source voltage, the controller 513 controls the driver unit 52 based on the conversion signal and the phase detection signal to operate the variable frequency DC motor 8 in such a way that the amplitude of the source voltage is irrelevant to any, if at all, variation of the rotary speed of the variable frequency DC motor 8, and that the rotary speed of the variable frequency DC motor 8 varies according to the phase of the input voltage at which the magnitude of the input voltage becomes non-zero. In an example, the rotary speed of the variable frequency DC motor 8 is higher when the phase of the input voltage at which the magnitude of the input voltage becomes non-zero is lower. For instance, when the phase of the input voltage at which the magnitude of the input voltage becomes non-zero is 45°, the rotary speed of the variable frequency DC motor 8 is 180 rpm; and when the phase of the input voltage at which the magnitude of the input voltage becomes non-zero is 90°, the rotary speed of the variable frequency DC motor 8 is 150 rpm. Under a second circumstance where it is determined that the input voltage is not obtained from processing the source voltage, the controller 513 controls the driver unit 52 in response to receipt of any one of the pull switch input signal and the remote control input signal to operate the variable frequency DC motor 8.

In application, the control device 93, the receiver module 4 and the control module 5 can be manufactured and purchased separately. The ceiling fan may basically be equipped with the pull switch device 2 and the control module 5, so the operating state (on/off) and the rotary speed of the variable frequency DC motor 8 may be adjusted by pulling the cord 21. A user may acquire, e.g., through making a purchase, at least one of the control device 93 or the receiver module 4 for the purpose of convenient operation.

In an example, the user may buy the control device 93, may mount the control device 93 on a wall, and may connect the control device 93 to the control module 5, so the operating state and the rotary speed of the variable frequency DC motor 8 can be adjusted by pulling the cord 21 and by operating the control device 93.

In another example, the user may buy the receiver module 4 that does not include the second receiver unit 42, and the remote controller 91 that uses the same remote control standard (e.g., a radio remote control standard) as the first receiver unit 41, may install the receiver module 4 in the ceiling fan, and may connect the receiver module 4 to the control module 5, so the operating state and the rotary speed of the variable frequency DC motor 8 can be adjusted by pulling the cord 21 and by operating the remote controller 91. Moreover, the user may buy another remote controller (not shown) that uses the same remote control standard as the first receiver unit 41, so the operating state and the rotary speed of the variable frequency DC motor 8 can also be adjusted by operating the another remote controller. Alternatively, the user may buy the second receiver unit 42 that uses a different remote control standard from the first receiver unit 41 (e.g., an infrared remote control standard), and the remote controller 92 that uses the same remote control standard as the second receiver unit 42, may install the second receiver unit 41 in the receiver module 4, may connect the second receiver unit 42 to the receiver control unit 43, and may mount the remote controller 92 on the wall, so the operating state and the rotary speed of the variable frequency DC motor 8 can also be adjusted by operating the second remote controller 92.

In yet another example, the user may buy the control device 93, the receiver module 4 and the remote controllers 91, 92, and may connect the control device 93 and the receiver module 4 to the control module 5, so the operating state and the rotary speed of the variable frequency DC motor 8 can be adjusted by pulling the cord 21 and by operating any of the remote controllers 91, 92 and the control device 93.

In view of the above, the motor control system has the following advantages:

1. By virtue of the control module 5 that operates the variable frequency DC motor 8 based on the pull switch input signal, the operating state and the rotary speed of the variable frequency DC motor 8 can be adjusted by pulling the cord 21.

2. By virtue of the control module 5 that operates the variable frequency DC motor 8 based not only on the remote control input signal, the operating state and the rotary speed of the variable frequency DC motor 8 can still be adjusted even if both the remote controllers 91, 92 cannot be used (e.g., the remote controller 91 is lost or broken while the remote controller 92 is broken).

3. By virtue of the control module 5 that operates the variable frequency DC motor 8 based not only on the input voltage, inclusion of the control device 93 in the motor control system can be optional, thereby increasing flexibility in configuring the motor control system.

4. By virtue of the control module 5 that operates the variable frequency DC motor 8 based not only on the remote control input signal, inclusion of the receiver module 4 in the motor control system may be optional, thereby increasing the flexibility in configuring the motor control system.

5. By virtue of the receiver control unit 43 that generates the remote control input signal in response to the receipt of any one of the first and second input signals, one of the first and second receiver units 41, 42 can be optionally omitted from the receiver module 4, thereby increasing the flexibility in configuring the motor control system.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that the disclosure is not limited to the disclosed embodiment but is intended to cover various arrangements included within the spirit and scope of the broadest interpretation so as to encompass all such modifications and equivalent arrangements.

What is claimed is:

1. A motor control device used to be coupled to a pull switch device and to a variable frequency direct current (DC) motor of a ceiling fan, the pull switch device generating a pull switch input signal in response to an operation performed thereon, said motor control device comprising:

a receiver module used to receive a first remote control signal, and generating a remote control input signal in response to receipt of the first remote control signal; and a control module used to receive an input voltage, used to be coupled to the pull switch device for receiving the pull switch input signal therefrom, coupled further to said receiver module for receiving the remote control input signal therefrom, and used to be coupled further to the variable frequency DC motor;

based on the input voltage, the pull switch input signal and the remote control input signal, said control module operating the variable frequency DC motor by turning the variable frequency DC motor on or off, or by adjusting a rotary speed of the variable frequency DC motor when the variable frequency DC motor is turned on.

2. The motor control device of claim 1, wherein the input voltage is associated with a source voltage, and said control module includes:
a control unit used to receive the input voltage, used to be coupled to the pull switch device for receiving the pull switch input signal therefrom, coupled further to said receiver module for receiving the remote control input signal therefrom, and determining whether the input voltage is obtained through processing the source voltage; and
a driver unit coupled to said control unit, and used to be coupled to the variable frequency DC motor;
under a first circumstance where it is determined that the input voltage is obtained through processing the source voltage, said driver unit being controlled by said control unit based on the input voltage to operate the variable frequency DC motor;
under a second circumstance where it is determined that the input voltage is not obtained through processing the source voltage, said driver unit being controlled by said control unit in response to receipt of any one of the pull switch input signal and the remote control input signal to operate the variable frequency DC motor.

3. The motor control device of claim 2, wherein the processing performed on the source voltage includes performing phase fired control on the source voltage.

4. The motor control device of claim 2, wherein said control unit includes:
a phase detector used to receive the input voltage, and detecting a phase of the input voltage at which a magnitude of the input voltage becomes non-zero to generate a phase detection signal; and
a controller coupled to said phase detector and said receiver module for receiving the phase detection signal and the remote control input signal respectively therefrom, used to be coupled further to the pull switch device for receiving the pull switch input signal therefrom, coupled further to said driver unit, and determining whether the input voltage is obtained through processing the source voltage based on the phase detection signal;
under the first circumstance, said driver unit being controlled by said controller based on the phase detection signal to operate the variable frequency DC motor;
under the second circumstance, said driver unit being controlled by said controller in response to receipt of any one of the pull switch input signal and the remote control input signal to operate the variable frequency DC motor.

5. The motor control device of claim 4, wherein, under the first circumstance, said driver unit is controlled by said controller based on the phase detection signal to operate the variable frequency DC motor in such a way that the rotary speed of the variable frequency DC motor varies according to the phase of the input voltage at which the magnitude of the input voltage becomes non-zero.

6. The motor control device of claim 4, wherein:
said control unit further includes an analog to digital converter that is used to receive the input voltage, and that performs analog to digital conversion on the input voltage to generate a conversion signal;
said controller is coupled further to said analog to digital converter for receiving the conversion signal therefrom, and further obtains an amplitude of the source voltage based on the conversion signal and the phase detection signal; and
under the first circumstance, said driver unit is controlled by said controller based further on the obtained amplitude to operate the variable frequency DC motor.

7. The motor control device of claim 6, wherein, under the first circumstance, said driver unit is controlled by said controller based further on the obtained amplitude to operate the variable frequency DC motor in such a way that the amplitude of the source voltage is irrelevant to variation of the rotary speed of the variable frequency DC motor.

8. The motor control device of claim 1, wherein said receiver module includes:
a first receiver unit used to receive the first remote control signal, and generating a first input signal in response to receipt of the first remote control signal;
a second receiver unit used to receive a second remote control signal, and generating a second input signal in response to receipt of the second remote control signal; and
a receiver control unit coupled to said first and second receiver units for receiving the first and second input signals respectively therefrom, coupled further to said control module, and generating the remote control input signal for receipt by said control module in response to receipt of any one of the first and second input signals.

9. A motor control system used to be coupled to a variable frequency direct current (DC) motor of a ceiling fan, said motor control system comprising:
a pull switch device generating a pull switch input signal in response to an operation performed thereon; and
a motor control device including
a receiver module used to receive a first remote control signal, and generating a remote control input signal in response to receipt of the first remote control signal, and
a control module used to receive an input voltage, coupled to said pull switch device and said receiver module for receiving the pull switch input signal and the remote control input signal respectively therefrom, and used to be coupled further to the variable frequency DC motor,
based on the input voltage, the pull switch input signal and the remote control input signal, said control module operating the variable frequency DC motor by turning the variable frequency DC motor on or off, or by adjusting a rotary speed of the variable frequency DC motor when the variable frequency DC motor is turned on.

10. The motor control system of claim 9, wherein the input voltage is associated with a source voltage, and said control module includes:
a control unit used to receive the input voltage, coupled to said pull switch device and said receiver module for receiving the pull switch input signal and the remote control input signal respectively therefrom, and determining whether the input voltage is obtained through processing the source voltage; and
a driver unit coupled to said control unit, and used to be coupled to the variable frequency DC motor;
under a first circumstance where it is determined that the input voltage is obtained through processing the source voltage, said driver unit being controlled by said control unit based on the input voltage to operate the variable frequency DC motor;

under a second circumstance where it is determined that the input voltage is not obtained through processing the source voltage, said driver unit being controlled by said control unit in response to receipt of any one of the pull switch input signal and the remote control input signal to operate the variable frequency DC motor.

11. The motor control system of claim 10, wherein the processing performed on the source voltage includes performing phase fired control on the source voltage.

12. The motor control system of claim 10, wherein said control unit includes:
   a phase detector used to receive the input voltage, and detecting a phase of the input voltage at which a magnitude of the input voltage becomes non-zero to generate a phase detection signal; and
   a controller coupled to said phase detector, said pull switch device and said receiver module for receiving the phase detection signal, the pull switch input signal and the remote control input signal respectively therefrom, coupled further to said driver unit, and determining whether the input voltage is obtained through processing the source voltage based on the phase detection signal;
   under the first circumstance, said driver unit being controlled by said controller based on the phase detection signal to operate the variable frequency DC motor;
   under the second circumstance, said driver unit being controlled by said controller in response to receipt of any one of the pull switch input signal and the remote control input signal to operate the variable frequency DC motor.

13. The motor control system of claim 12, wherein, under the first circumstance, said driver unit is controlled by said controller based on the phase detection signal to operate the variable frequency DC motor in such a way that the rotary speed of the variable frequency DC motor varies according to the phase of the input voltage at which the magnitude of the input voltage becomes non-zero.

14. The motor control system of claim 12, wherein:
   said control unit further includes an analog to digital converter that is used to receive the input voltage, and that performs analog to digital conversion on the input voltage to generate a conversion signal;
   said controller is coupled further to said analog to digital converter for receiving the conversion signal therefrom, and further obtains an amplitude of the source voltage based on the conversion signal and the phase detection signal; and
   under the first circumstance, said driver unit is controlled by said controller based further on the obtained amplitude to operate the variable frequency DC motor.

15. The motor control system of claim 14, wherein, under the first circumstance, said driver unit is controlled by said controller based further on the obtained amplitude to operate the variable frequency DC motor in such a way that the amplitude of the source voltage is irrelevant to variation of the rotary speed of the variable frequency DC motor.

16. The motor control system of claim 9, wherein said receiver module includes:
   a first receiver unit used to receive the first remote control signal, and generating a first input signal in response to receipt of the first remote control signal;
   a second receiver unit used to receive a second remote control signal, and generating a second input signal in response to receipt of the second remote control signal; and
   a receiver control unit coupled to said first and second receiver units for receiving the first and second input signals respectively therefrom, coupled further to said control module, and generating the remote control input signal for receipt by said control module in response to receipt of any one of the first and second input signals.

17. A control module used to be coupled to a pull switch device, to a receiver module and to a variable frequency direct current (DC) motor of a ceiling fan, the pull switch device generating a pull switch input signal in response to an operation performed thereon, the receiver module generating a remote control input signal in response to receipt of a remote control signal, said control module comprising:
   a control unit used to receive an input voltage, and used to be coupled to the pull switch device and the receiver module for receiving the pull switch input signal and the remote control input signal respectively therefrom; and
   a driver unit coupled to said control unit, and used to be coupled to the variable frequency DC motor;
   said driver unit being controlled by said control unit based on the input voltage, the pull switch input signal and the remote control input signal to operate the variable frequency DC motor by turning the variable frequency DC motor on or off, or by adjusting a rotary speed of the variable frequency DC motor when the variable frequency DC motor is turned on.

\* \* \* \* \*

(12) EX PARTE REEXAMINATION CERTIFICATE (11703rd)
United States Patent
Lin

(10) Number: US 10,158,309 C1
(45) Certificate Issued: Jul. 24, 2020

(54) MOTOR CONTROL DEVICE, MOTOR CONTROL SYSTEM USING THE SAME AND CONTROL MODULE OF THE SAME

(71) Applicant: Kuo-Tsun Lin, Taichung (TW)

(72) Inventor: Kuo-Tsun Lin, Taichung (TW)

(73) Assignee: Kue-Tsun Lin, Taichung (TW)

Reexamination Request:
No. 90/020,130, Aug. 26, 2019

Reexamination Certificate for:
Patent No.: 10,158,309
Issued: Dec. 18, 2018
Appl. No.: 15/793,330
Filed: Oct. 25, 2017

(51) Int. Cl.
*H02P 7/06* (2006.01)
*F04D 25/08* (2006.01)
*H02K 11/00* (2016.01)
*F04D 27/00* (2006.01)
*H02K 11/33* (2016.01)
*H02P 6/08* (2016.01)

(52) U.S. Cl.
CPC ............ *H02P 7/06* (2013.01); *F04D 25/088* (2013.01); *F04D 27/004* (2013.01); *H02K 11/0094* (2013.01); *H02K 11/33* (2016.01); *H02P 6/08* (2013.01)

(58) Field of Classification Search
None
See application file for complete search history.

(56) References Cited

To view the complete listing of prior art documents cited during the proceeding for Reexamination Control Number 90/020,130, please refer to the USPTO's public Patent Application Information Retrieval (PAIR) system under the Display References tab.

*Primary Examiner* — Minh Nguyen

(57) ABSTRACT

A motor control device includes: a receiver module used to receive a remote control signal, and generating a remote control input signal in response to receipt of the remote control signal; and a control module used to receive an input voltage, used to be coupled to a pull switch device for receiving a pull switch input signal therefrom, coupled further to the receiver module for receiving the remote control input signal therefrom, and used to be coupled further to a variable frequency DC motor of a ceiling fan. Based on the input voltage, the pull switch input signal and the remote control input signal, the control module operates the motor by turning on/off the motor, or by adjusting a rotary speed of the motor when the same is turned on.

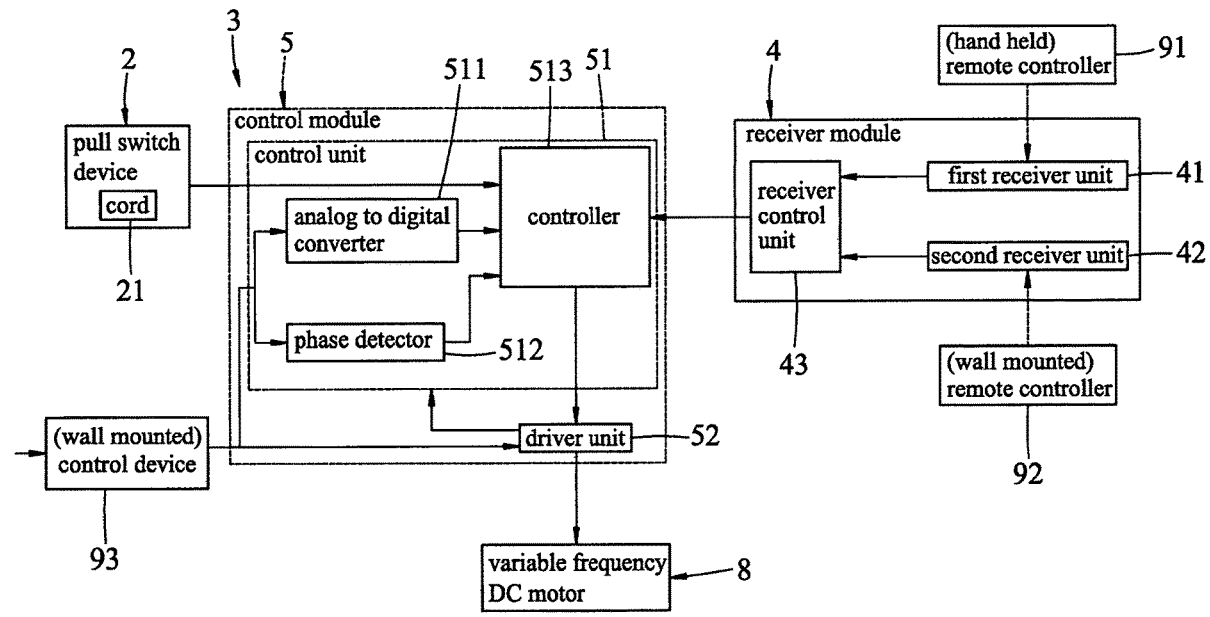

US 10,158,309 C1

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2, 4, 10 and 12 are cancelled.

Claims 1, 3, 5-6, 9, 11, 13-14 and 17 are determined to be patentable as amended.

Claims 7-8 and 15-16, dependent on an amended claim, are determined to be patentable.

1. A motor control device used to be coupled to a pull switch device and to a variable frequency direct current (DC) motor of a ceiling fan, the pull switch device generating a pull switch input signal in response to an operation performed thereon, said motor control device comprising:
a receiver module used to receive a first remote control signal, and generating a remote control input signal in response to receipt of the first remote control signal; and
a control module used to receive an input voltage, used to be coupled to the pull switch device for receiving the pull switch input signal therefrom, coupled further to said receiver module for receiving the remote control input signal therefrom, and used to be coupled further to the variable frequency DC motor;
based on the input voltage, the pull switch input signal and the remote control input signal, said control module operating the variable frequency DC motor by turning the variable frequency DC motor on or off, or by adjusting a rotary speed of the variable frequency DC motor when the variable frequency DC motor is turned on;
*wherein the input voltage is associated with a source voltage, and said control module includes*
*a control unit including a phase detector and a controller, said phase detector being used to receive the input voltage, and detecting a phase of the input voltage at which a magnitude of the input voltage becomes non-zero to generate a phase detection signal, said controller being coupled to said phase detector and said receiver module for receiving the phase detection signal and the remote control input signal respectively therefrom, being used to be coupled further to the pull switch device for receiving the pull switch input signal therefrom, and determining whether the input voltage is obtained through processing the source voltage based on the phase detection signal, and*
*a driver unit coupled to said controller, and used to be coupled to the variable frequency DC motor,*
*under a first circumstance where it is determined that the input voltage is obtained through processing the source voltage, said driver unit being controlled by said controller based on the phase detection signal to operate the variable frequency DC motor,*
*under a second circumstance where it is determined that the input voltage is not obtained through processing the source voltage, said driver unit being controlled by said* controller in response to receipt of any one of the pull switch input signal and the remote control input signal to operate the variable frequency DC motor.

3. The motor control device of claim [2] *1*, wherein the processing performed on the source voltage includes performing phase fired control on the source voltage.

5. The motor control device of claim [4] *1*, wherein, under the first circumstance, said driver unit is controlled by said controller based on the phase detection signal to operate the variable frequency DC motor in such a way that the rotary speed of the variable frequency DC motor varies according to the phase of the input voltage at which the magnitude of the input voltage becomes non-zero.

6. The motor control device of claim [4] *1*, wherein:
said control unit further includes an analog to digital converter that is used to receive the input voltage, and that performs analog to digital conversion on the input voltage to generate a conversion signal;
said controller is coupled further to said analog to digital converter for receiving the conversion signal therefrom, and further obtains an amplitude of the source voltage based on the conversion signal and the phase detection signal; and
under the first circumstance, said driver unit is controlled by said controller based further on the obtained amplitude to operate the variable frequency DC motor.

9. A motor control system used to be coupled to a variable frequency direct current (DC) motor of a ceiling fan, said motor control system comprising:
a pull switch device generating a pull switch input signal in response to an operation performed thereon; and
a motor control device including
a receiver module used to receive a first remote control signal, and generating a remote control input signal in response to receipt of the first remote control signal, and
a control module used to receive an input voltage, coupled to said pull switch device and said receiver module for receiving the pull switch input signal and the remote control input signal respectively therefrom, and used to be coupled further to the variable frequency DC motor,
based on the input voltage, the pull switch input signal and the remote control input signal, said control module operating the variable frequency DC motor by turning the variable frequency DC motor on or off, or by adjusting a rotary speed of the variable frequency DC motor when the variable frequency DC motor is turned on;
*wherein the input voltage is associated with a source voltage, and said control module includes*
*a control unit including a phase detector and a controller, said phase detector being used to receive the input voltage, and detecting a phase of the input voltage at which a magnitude of the input voltage becomes non-zero to generate a phase detection signal, said controller being coupled to said phase detector, said pull switch device and said receiver module for receiving the phase detection signal, the pull switch input signal and the remote control input signal respectively therefrom, and determining whether the input voltage is obtained through processing the source voltage based on the phase detection signal, and*
*a driver unit coupled to said controller, and used to be coupled to the variable frequency DC motor,*
*under a first circumstance where it is determined that the input voltage is obtained through processing the source*

*voltage, said driver unit being controlled by said controller based on the phase detection signal to operate the variable frequency DC motor,*

*under a second circumstance where it is determined that the input voltage is not obtained through processing the source voltage, said driver unit being controlled by said controller in response to receipt of any one of the pull switch input signal and the remote control input signal to operate the variable frequency DC motor.*

11. The motor control system of claim [10] 9, wherein the processing performed on the source voltage includes performing phase fired control on the source voltage.

13. The motor control system of claim [12] 9, wherein, under the first circumstance, said driver unit is controlled by said controller based on the phase detection signal to operate the variable frequency DC motor in such a way that the rotary speed of the variable frequency DC motor varies according to the phase of the input voltage at which the magnitude of the input voltage becomes non-zero.

14. The motor control system of claim [12] 9, wherein:
said control unit further includes an analog to digital converter that is used to receive the input voltage, and that performs analog to digital conversion on the input voltage to generate a conversion signal;
said controller is coupled further to said analog to digital converter for receiving the conversion signal therefrom, and further obtains an amplitude of the source voltage based on the conversion signal and the phase detection signal; and
under the first circumstance, said driver unit is controlled by said controller based further on the obtained amplitude to operate the variable frequency DC motor.

17. A control module used to be coupled to a pull switch device, to a receiver module and to a variable frequency direct current (DC) motor of a ceiling fan, the pull switch device generating a pull switch input signal in response to an operation performed thereon, the receiver module generating a remote control input signal in response to receipt of a remote control signal, said control module comprising:
a control unit used to receive an input voltage, and used to be coupled to the pull switch device and the receiver module for receiving the pull switch input signal and the remote control input signal respectively therefrom; and
a driver unit coupled to said control unit, and used to be coupled to the variable frequency DC motor;
said driver unit being controlled by said control unit based on the input voltage, the pull switch input signal and the remote control input signal to operate the variable frequency DC motor by turning the variable frequency DC motor on or off, or by adjusting a rotary speed of the variable frequency DC motor when the variable frequency DC motor is turned on*;*

*the input voltage being associated with a source voltage;*

*said control unit including a phase detector and a controller, said phase detector being used to receive the input voltage, and detecting a phase of the input voltage at which a magnitude of the input voltage becomes non-zero to generate a phase detection signal, said controller being coupled to said phase detector for receiving the phase detection signal therefrom, being used to be coupled further to the pull switch device and the receiver module for receiving the pull switch input signal and the remote control input signal respectively therefrom, being coupled further to said driver unit, and determining whether the input voltage is obtained through processing the source voltage based on the phase detection signal;*

*under a first circumstance where it is determined that the input voltage is obtained through processing the source voltage, said driver unit being controlled by said controller based on the phase detection signal to operate the variable frequency DC motor;*

*under a second circumstance where it is determined that the input voltage is not obtained through processing the source voltage, said driver unit being controlled by said controller in response to receipt of any one of the pull switch input signal and the remote control input signal to operate the variable frequency DC motor.*

\* \* \* \* \*